United States Patent
Tobler et al.

(10) Patent No.: US 9,385,963 B1
(45) Date of Patent: *Jul. 5, 2016

(54) SYSTEM AND METHOD FOR ALLOCATING RESOURCES FOR HETEROGENEOUS SERVICE REQUESTS

(71) Applicant: Amazon Technologies, Inc., Reno, NV (US)

(72) Inventors: Benjamin Tobler, Seattle, WA (US); Marc J. Brooker, Cape Town (ZA); Christopher Richard Jacques De Kadt, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,660

(22) Filed: Aug. 5, 2013

Related U.S. Application Data

(63) Continuation of application No. 12/981,263, filed on Dec. 29, 2010, now Pat. No. 8,504,691.

(51) Int. Cl.
*H04L 12/26* (2006.01)
*H04L 12/911* (2013.01)

(52) U.S. Cl.
CPC ...................... *H04L 47/70* (2013.01)

(58) Field of Classification Search
CPC . H04L 29/06; H04L 67/1023; H04L 67/1097; H04L 69/16; H04L 69/22; H04L 69/329
USPC .......... 709/224, 226, 227, 203, 217, 228, 229
See application file for complete search history.

(56) References Cited

U.S. PATENT DOCUMENTS

| | | | |
|---|---|---|---|
| 7,487,250 B2 * | 2/2009 | Siegel | 709/227 |
| 7,685,298 B2 | 3/2010 | Day et al. | |
| 7,774,492 B2 | 8/2010 | Raphel et al. | |
| 7,801,978 B1 * | 9/2010 | Susai et al. | 709/224 |
| 8,214,521 B2 | 7/2012 | Takagi et al. | |
| 2004/0187120 A1 | 9/2004 | Moore et al. | |
| 2004/0210663 A1 | 10/2004 | Phillips et al. | |
| 2004/0215578 A1 | 10/2004 | Das | |
| 2005/0021511 A1 * | 1/2005 | Zarom | 707/3 |
| 2005/0068798 A1 * | 3/2005 | Lee et al. | 365/49 |

(Continued)

*Primary Examiner* — Dang Ton
*Assistant Examiner* — Sai Aung
(74) *Attorney, Agent, or Firm* — Robert C. Kowert; Meyertons, Hood, Kivlin, Kowert & Goetzel, P.C.

(57) ABSTRACT

A system for allocating constrained resources (e.g., downstream services, execution threads, database connections, input/output channels, computational resources, and/or memory) to requested services that are dependent on those resources may include multiple resource queues, each of which maintains a queue of requests for a respective constrained resource, and multiple service request queues, from which requests may be subsequently serviced. As each request reaches the head of a resource queue, it may receive a resource token for a respective constrained resource. Once the request has collected resource tokens for each of the constrained resources on which it depends, the request may be passed to a service request queue that maintains a queue of requests of a particular type. Requests in the multiple service request queues may be serviced on a round-robin or weighted round-robin basis. The number of tokens available for each constrained resource may be modified based on observed system performance.

20 Claims, 10 Drawing Sheets

(56) References Cited

U.S. PATENT DOCUMENTS

| | | |
|---|---|---|
| 2005/0138621 A1* | 6/2005 | Clark et al. .................... 718/100 |
| 2005/0190779 A1* | 9/2005 | Hoffman et al. ............. 370/412 |
| 2006/0080416 A1 | 4/2006 | Gandhi |
| 2007/0212071 A1* | 9/2007 | Guo et al. ....................... 398/69 |
| 2009/0037585 A1 | 2/2009 | Miloushev et al. |
| 2009/0049200 A1 | 2/2009 | Lin et al. |
| 2009/0259749 A1* | 10/2009 | Barrett et al. ................. 709/224 |
| 2009/0296582 A1* | 12/2009 | Shi et al. ....................... 370/236 |
| 2009/0300183 A1* | 12/2009 | Feng et al. .................... 709/226 |
| 2009/0319687 A1* | 12/2009 | Goldstein et al. ............. 709/241 |
| 2010/0030896 A1 | 2/2010 | Chandramouli et al. |
| 2010/0146512 A1* | 6/2010 | Chen et al. .................... 718/103 |
| 2010/0169486 A1 | 7/2010 | Mccormack et al. |
| 2010/0208665 A1* | 8/2010 | Vivanco et al. ............... 370/329 |
| 2010/0229179 A1* | 9/2010 | Moore et al. .................. 718/104 |
| 2010/0287227 A1* | 11/2010 | Goel et al. ..................... 709/202 |
| 2011/0153839 A1* | 6/2011 | Rajan et al. ................... 709/227 |
| 2011/0292792 A1* | 12/2011 | Zuo et al. ...................... 370/230 |

* cited by examiner

SYSTEM AND METHOD FOR ALLOCATING RESOURCES FOR HETEROGENEOUS SERVICE REQUESTS

This application is a continuation of U.S. application Ser. No. 12/981,263, filed Dec. 29, 2010, now U.S. Pat. No. 8,504,691, which is hereby incorporated by reference herein in its entirety.

BACKGROUND

In a typical Web service or remote procedure call (RPC) service, a pool of worker threads services a queue of incoming requests, performing the work that is required for the request and responding to the requester when the work is complete. When services of this kind are deployed in a service architecture, it is typical for such service threads to be blocked while waiting on calls to downstream services, requests for database connections, access to input/output mechanisms (e.g., I/O channels), and/or on other constrained resources on which they depend (e.g., computational resources or memory). When these constrained resources become unavailable or slow to respond, service requests that require them tend to cause all of the available service threads in the system to become blocked while waiting for these resources.

Typical approaches to solving this problem include the use of asynchronous input/output mechanisms, timeouts for in-flight requests, and timeouts around calls that may become slow or block other services. While these approaches are typically effective, they are difficult to add to existing services, add complexity to the service implementation, increase the difficulty of predicting system performance, and significantly reduce throughput. Another common approach is the use of admission control for requests, which prevents too many requests from being accepted, e.g., by throttling.

Figure 1:
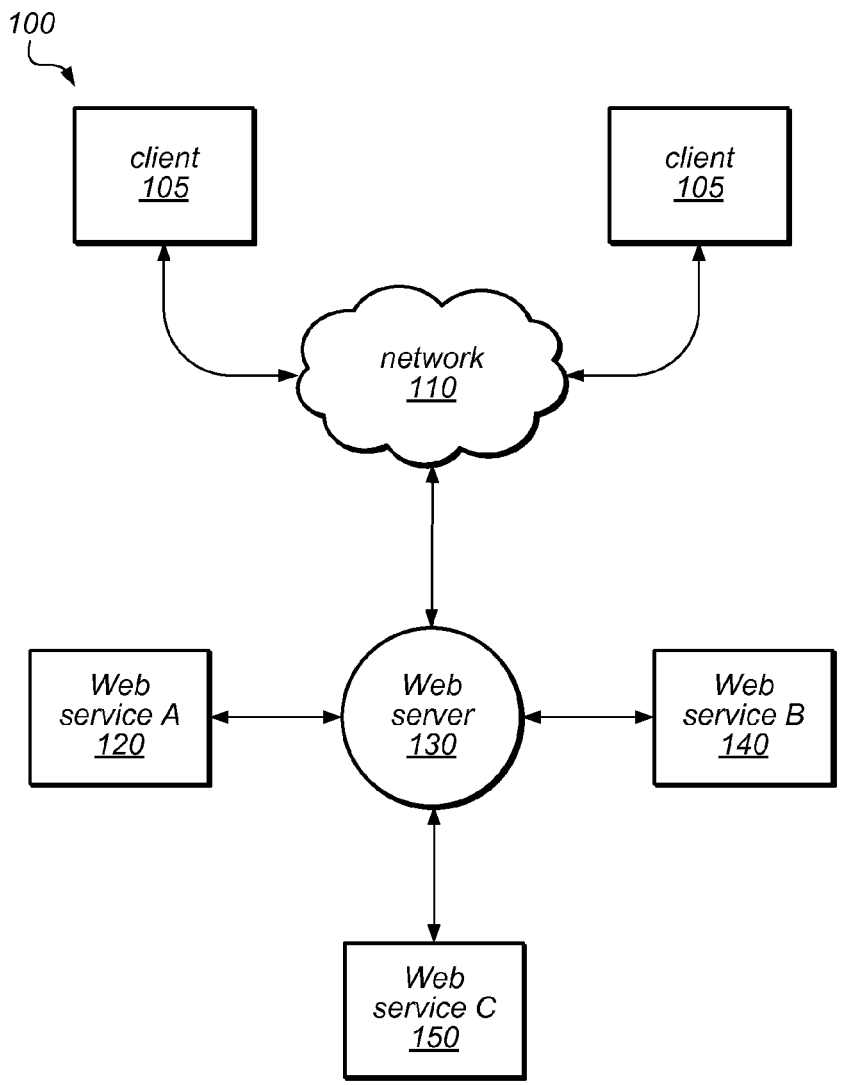
FIG. 1 is a block diagram illustrating components of a system that provides various Web-based services to clients, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

Systems and methods for allocating constrained resources (e.g., downstream services, execution threads, database connections, input/output channels, computational resources, or a portion of system memory, disk memory, or another persistent storage resource) to requested services that are dependent on those constrained resources are described herein, according to various embodiments. In some embodiments, the system may include multiple resource queues, each of which may maintain a queue of requests for a respective constrained resource. As each request reaches the head of a resource queue, it may receive a resource token for the respective constrained resource from a resource token bucket associated with the resource queue. In some embodiments, the number of tokens available for each constrained resource (i.e. allocated for each resource token bucket) may be modified based on observed system performance.

In some embodiments, once a request has collected resource tokens for each of the constrained resources on which it depends, the request may be passed to a service request queue, from which the request may be subsequently serviced (e.g., on a first-in-first-out basis). In some embodiments, the system may include multiple service request queues, each of which maintains a queue of requests of a particular type, for a particular service, or for particular clients. Requests in the multiple service request queues may be serviced on a round-robin or weighted round-robin basis, in various embodiments.

In some embodiments, having two queuing stages (e.g., one stage including resource queues in an admission control subsystem, and a second stage including separate service request queues), as described herein, may help the system absorb surges or spikes in the number of service requests received. Therefore, the systems described herein may achieve higher performance (e.g., throughput) than systems in which requests are blocked by other requests at a single queuing stage.

Allocation of Constrained Resources

As noted above, a typical Web service or RPC service may employ a pool of worker threads to service a queue of incoming requests, performing the work that is required for the request and responding to the requester when the work is complete. However, in services of this kind, service threads may be blocked while waiting on calls to downstream services, requests for database connections, access to input/output mechanisms, and/or on other constrained resources on which they depend (e.g., computational resources or memory).

The systems and methods described herein may in various embodiments employ an approach to admission control that is based on explicit identification of service dependencies and prioritization of service requests based on observed system performance. In some embodiments, these systems and methods may be suitable for use in heterogeneous Web services or RPC services, which may provide multiple services (e.g., multiple service calls or service call types), each of which may have different dependencies and exhibit different behaviors. In some embodiments, the queuing techniques described herein may be well suited for Web services that must offer both high throughput and high availability during traffic spikes. For example, rather than simply dropping requests at times of high traffic (as with typical admission control approaches), the systems described herein may perform a reprioritization of constrained resources under such conditions.

Various techniques described herein may be employed in local or remote systems, including systems that provide services to users (e.g., subscribers) over the Internet or over other public or private networks, such as virtual private networks and connections to services in a virtual private cloud (VPC) environment. FIG. 1 illustrates a block diagram of a system that provides various Web-based services to clients, according to one embodiment. In this example, system 100 includes one or more clients 105. In this example, the clients 105 may be configured to interact with a Web server 130 via a communication network 110.

As illustrated in this example, the Web server 130 may be configured to process requests from clients 105 for various services, such as Web service A (120), Web service B (140), and Web service C (150), and to return results to the clients 105. In various embodiments, some or all of these Web services may be dependent on one or more downstream services and/or other constrained resources, and Web server 100 may be configured to allocate those downstream services and/or other constrained resources to individual client requests in order to provide the requested services. Various components of a Web server or other computer system configured to allocate constrained resources to service requests are illustrated in FIG. 2 and described in detail below.

In the example illustrated in FIG. 1, the clients 105 may encompass any type of clients configured to submit service requests to Web server 130 via network 110 on behalf of a user or a requesting application. For example, a given client 105 may include a suitable version of a Web browser, or a plugin module or other type of code module configured to execute as an extension to or within an execution environment provided by a Web browser. Alternatively, a client 105 may encompass an application such as a database application, media application, office application, or any other application that may make use of the services provided by Web server 130. In some embodiments, such an application may include sufficient protocol support (e.g., for a suitable version of Hypertext Transfer Protocol (HTTP)) for generating and processing Web service requests without necessarily implementing full browser support for all types of Web-based data. That is, client 105 may be an application configured to interact directly with Web server 130. In various embodiments, client 105 may be configured to generate requests for Web services according to a Representational State Transfer (REST)-style Web services architecture, a document or message-based Web services architecture, or another suitable Web services architecture. In some embodiments, client 105 may be configured to provide access to Web-based service to other applications in a manner that is transparent to those applications. For example, a client 105 may be configured to integrate with an operating system to provide services in accordance with a suitable variant of the service model described herein. However, the operating system may present a different service request interface to applications than that described herein.

In various embodiments, the communication network 110 may encompass any suitable combination of networking hardware and protocols necessary to establish Web-based communications between clients 105 and Web server 130. For example, the communication network 110 may generally encompass the various telecommunications networks and service providers that collectively implement the Internet. The communication network 110 may also include private networks such as local area networks (LANs) or wide area networks (WANs) as well as public or private wireless networks. For example, both a given client 105 and the Web server 130 may be respectively provisioned within enterprises having their own internal networks. In such an embodiment, the communication network 110 may include the hardware (e.g., modems, routers, switches, load balancers, proxy servers, etc.) and software (e.g., protocol stacks, accounting software, firewall/security software, etc.) necessary to establish a networking link between the given client 105 and the Internet as well as between the Internet and Web server 130. Note that in some embodiments, clients 105 may communicate with Web server 130 using a private network rather than the public Internet. For example, in some embodiments clients 105 may be provisioned within the same enterprise as the resources that provide various services to those clients. In such a case, clients 105 may communicate with a server 130 entirely through a private communication network (not shown).

Figure 2:
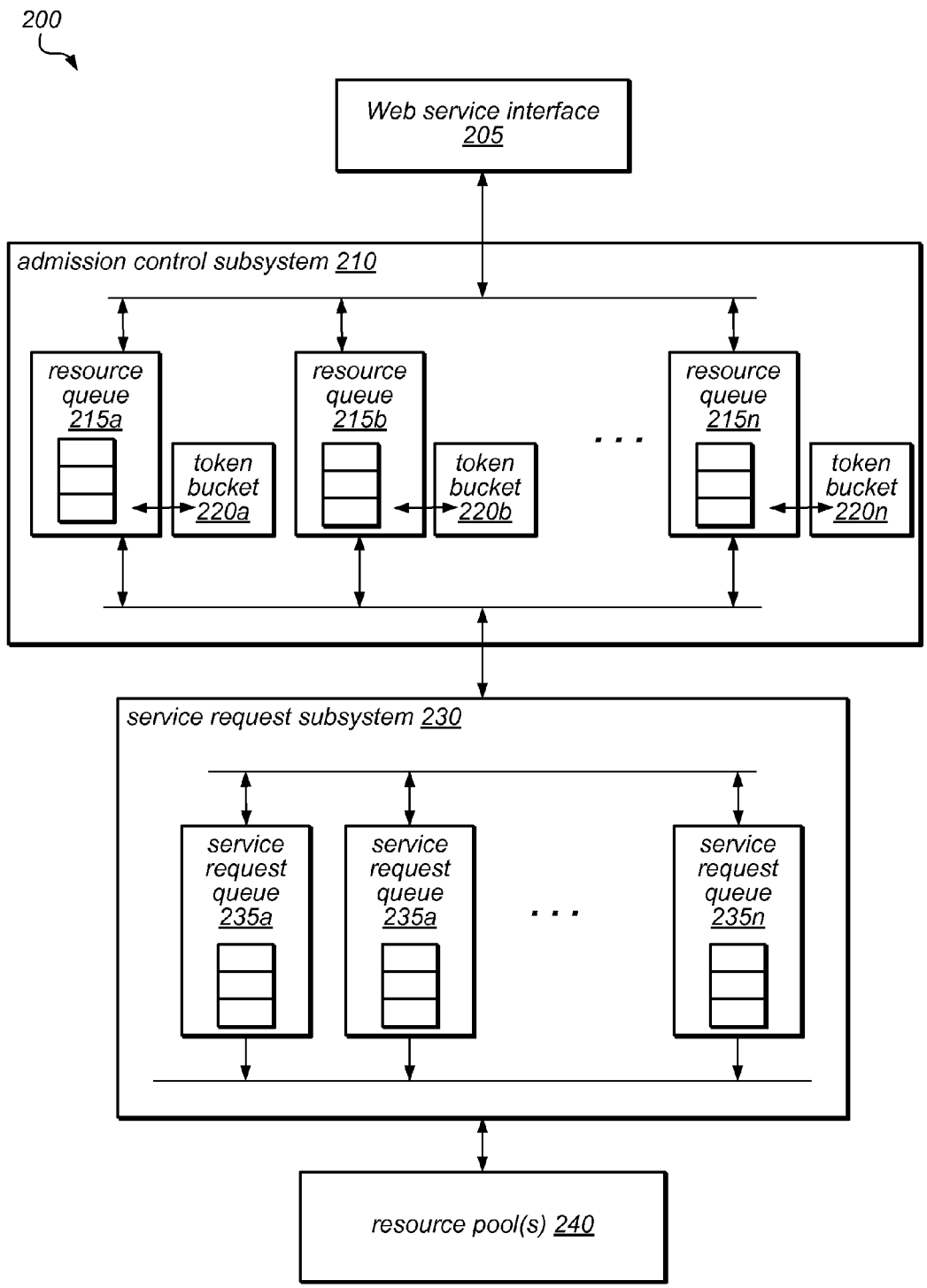
FIG. 2 is a block diagram illustrating subsystems of a system that provides various Web-based services to clients, according to one embodiment.

FIG. 2 is a block diagram illustrating a computing system 200 that provides various Web-based services to clients, according to some embodiments. For example, in some embodiments, computing system 200 may implement a Web server, such as Web server 130 illustrated in FIG. 1. In various embodiments, computer system 200 maybe configured to allocate a variety of constrained resources (which may include, for example, downstream services, database connections, input/output channels, computational resources, execution threads, a portion of system memory, disk memory or other persistent storage resources, or any other constrained resources) from one or more pools of those constrained resources to service requests in order to provide services requested by various clients. As illustrated in this example, computing system 200 may include a Web service interface 205, an admission control subsystem 210, a service request subsystem 230, and/or one or more resource pools 240.

In this example, Web services interface 205 may be configured to receive requests for services from various clients and to communicate with admission control subsystem 210 to facilitate the performance of those services on behalf of the clients. For example, in some embodiments, admission control subsystem 210 may be configured to communicate with a service request subsystem 230 to admit one or more service requests into a service request queue 235, and service request subsystem 230 may in turn be configured to allocate (or initiate allocation of) one or more constrained resources needed to perform the requested services to those requests from resource pool(s) 240. In some embodiments, Web service interface 205 may utilize predefined instructions or communications, such as via defined application protocol interfaces (APIs), to communicate with admission control subsystem 210 and/or other components of computing system 200 on behalf of a client.

As illustrated in this example, in some embodiments admission control subsystem 210 may include multiple resource queues (shown as resource queues 215a-215n), each of which queues requests for a given downstream service or other constrained resource. As illustrated in this example, each of these resources queues may be associated with a respective resource token bucket (shown as token buckets 220a-220n). The operation of an admission control subsystem is described in more detail below, according to various embodiments.

As illustrated in this example, in some embodiments service request subsystem 230 may include multiple service request queues (shown as service request queues 235a-235n), each of which queues requests for a particular subset of the service requests provided by computing system 200. For example, in some embodiments, requests may be placed in a particular one of service request queues 235 according to the type of service request (e.g., according to the Web service API called to make the request). In other embodiments, requests may be placed in a particular one of the service request queues 235 that maintains a queue for a particular web-based service, for a particular client of the computing system, or for a particular group of clients of the computing system (e.g., for clients having a particular priority or service level). In some embodiments, the system may apply a stochastic fair queuing algorithm as part of its process for determining the particular one of a plurality of service request queues in which to place a given request. For example, in some embodiments, a request may be placed in a particular service request queue dependent on a hashing of a portion of the information included in the request (e.g., information identifying the client from which the request was received, a client group or classification, the request type, a service level, or any other information included in the request). In such embodiments, the hashing applied to the requests may be keyed with a periodically changing key in order to avoid or prevent starvation of the service threads or other constrained resources being managed in the system. The operation of a service request subsystem is described in more detail below, according to various embodiments.

Note that in various embodiments, the components illustrated in FIGS. 1 and 2 may be implemented directly within computer hardware, as instructions directly or indirectly executable by computer hardware (e.g., a microprocessor or computer system), or as a combination of these techniques. For example, the components of the computing system 200 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIG. 1 and/or FIG. 2.

As illustrated in FIG. 2, a first stage of the admission control strategy described herein may employ a set of resource queues (one per constrained resource on which various services may be dependent), and each of those resource queues may be associated with a resource token bucket for that constrained resource. In some embodiments, a fixed (e.g., a pre-determined or default) number of resource tokens may be placed into each resource token bucket at launch time or during configuration of the system. In some embodiments, the initial number of resource tokens allocated to each resource queues and corresponding constrained resources may be dependent on the available resources in the system. For example, in some embodiments a resource token bucket associated with a resource queue for a downstream service may be allocated a number of resource tokens that is equal to (or dependent on) the number of available service threads and/or the maximum number of service threads that may be allocated to calls for each downstream service on which a service is dependent. In various embodiments, the total number of service thread tokens allocated for all downstream services may be less than, equal to, or greater than the total number of service threads available in the system. Various service requests may collect resource tokens for constrained resources on which they depend and may cause them to be returned to the same or other token buckets following the completion of the requested service. In some embodiments, the number of resource tokens allocated to a given resource token bucket may be subsequently modified, as described in more detail below.

In some embodiments, when a service call (sometimes referred to herein as a service request) is received by a system that provides one or more services, it may be categorized according to the dependencies it requires (e.g., according to the constrained resources on which it depends), and may be placed into a respective queue for each of these dependencies. Each of these resource queues may be continuously serviced, with work items (requests) being removed from the resource queue and assigned resource tokens as the token bucket for that resource queue is continuously refilled. When a request has been removed from all its dependency queues (i.e. when it has collected resource tokens for all of the constrained resources on which it is dependent), the request may be available for queuing in the second stage, e.g., in a service request queue. As noted above, once the request has been processed to completion, all of the resource tokens allocated to it may be placed back in the relevant token buckets for each of these constrained resources, unless they are placed into a different token bucket as a result of a re-allocation exercise. Note that in some embodiments, if a request times out before collecting resource tokens for all of the constrained resources on which it is dependent (e.g., if it remains in one or more resource queues longer than a pre-determined timeout period), the entire request may fail and any resource tokens that had been collected up to that point may be returned to the resource token buckets from which they were obtained and/or to other resource token buckets. Note also that if one or more queues in the system into which a request is to be placed (e.g., one or more relevant resource queues or an applicable service request queue) has reached a pre-determined length limit, the request may be rejected outright, in some embodiments.

Figure 3:
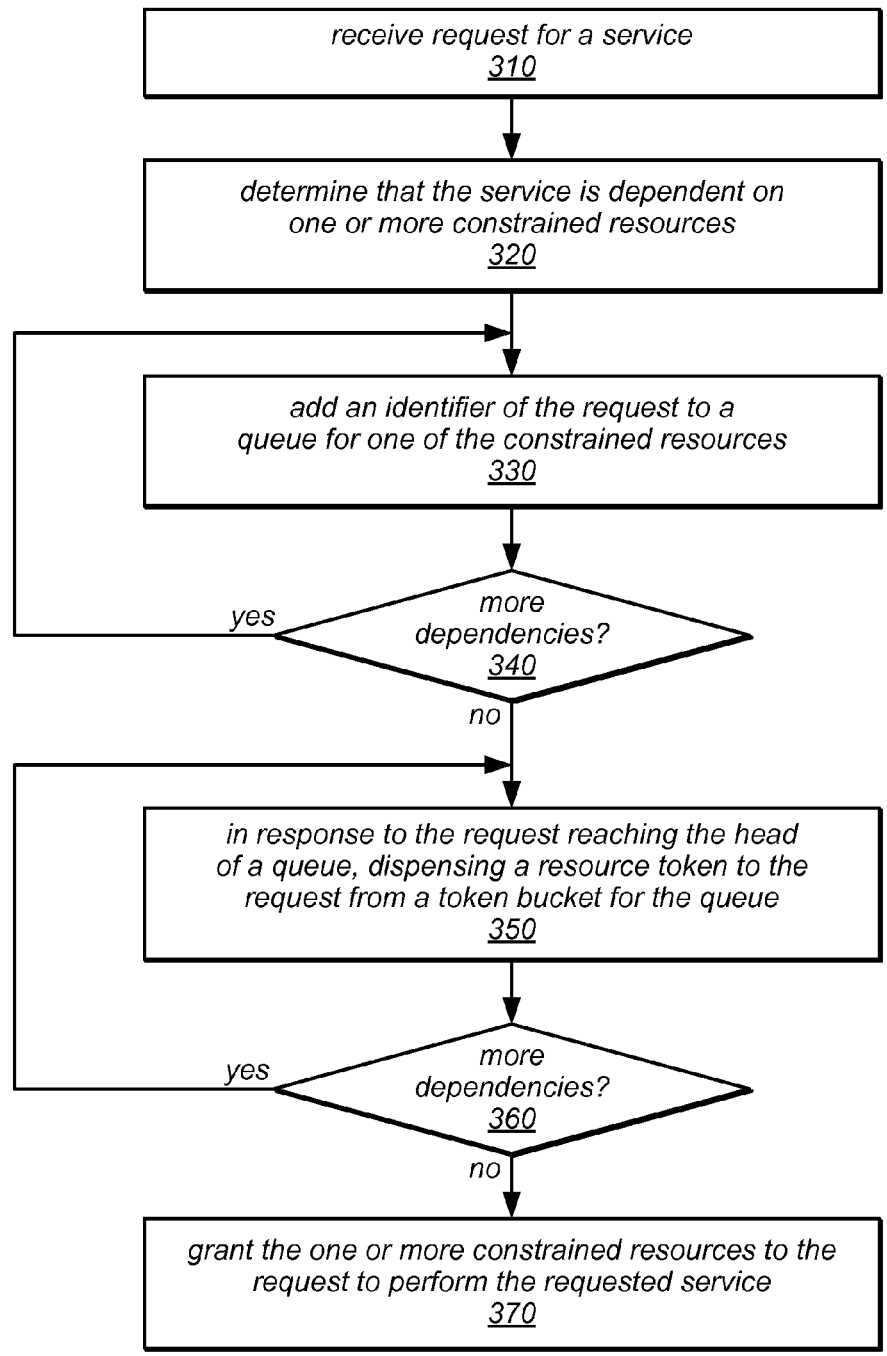
FIG. 3 is a flow diagram illustrating a method for allocating constrained resources to heterogeneous service requests, according to one embodiment.

A method for allocating constrained resources to heterogeneous service requests is illustrated by the flow diagram in FIG. 3, according to one embodiment. As illustrated in this example, the method may include a computing system configured to provide various services to clients receiving a request for a service (e.g., a Web-based service), as in 310. The method may include determining that the requested service is dependent on one or more constrained resources (e.g., downstream services, database connections, input/output channels, computational resources, execution threads, system memory, disk memory or other persistent storage resources, or any other constrained resources), as in 320. In some embodiments, the computing system may place the request in a resource queue for one of the constrained resources on which the requested service is dependent, as in 330. For example, placing a request in a queue (e.g., in one of the resource queues and/or service request queues described herein) may in some embodiments involve adding an identifier of the request to the queue. If the request is dependent on other constrained resources, shown as the positive exit from 340, the method may include adding an identifier of the request to a resource queue for each of the other constrained resources on which the requested service is dependent. This is illustrated in FIG. 3 by the feedback from 340 to 330.

As illustrated in this example, in response to the request reaching the head of a resource queue, the computing system may dispense a resource token for the corresponding constrained resource to the request from a resource token bucket associated with the resource queue, as in 350. If the request is dependent on other constrained resources, shown as the positive exit from 360, the method may include the request collecting resource tokens for each of the other constrained resources on which the requested service is dependent as the request reaches the head of the respective resource queue for each of those constrained resources. This is illustrated in FIG. 3 by the feedback from 360 to 350. In one embodiment, each resource token in the system may include a unique identifier, and each request may be associated with a data structure that includes an identifier of the request and an array in which such unique token identifiers may be stored when a resource token for each dependent resource is dispensed to the request. In this example, each token bucket may be implemented as a data structure (e.g., an array) storing the unique identifiers of the resource tokens in the bucket. In this example, when a resource token is dispensed from a token bucket, one of the unique token identifiers may be removed from the token bucket data structure and written in the request data structure. In this example, when a service request is completed, the unique token identifiers dispensed to that request may be deleted from the request data structure and written into one or more token bucket data structures.

In some embodiments, once the resource has collected a resource token for each of the constrained resources on which the requested service is dependent, the method may include granting the one or more constrained resources to the request to perform the requested service, as in 370.

Figure 4B:
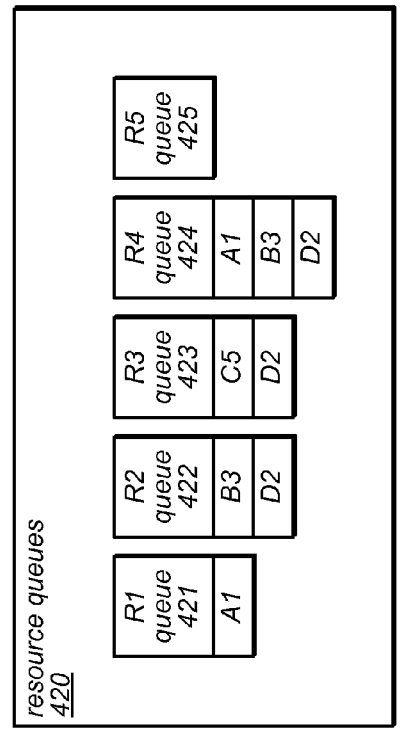
FIGS. 4A and 4B illustrate the queuing of service requests into resource-specific queues for the resources on which they depend, according to one embodiment.
Figure 4A:
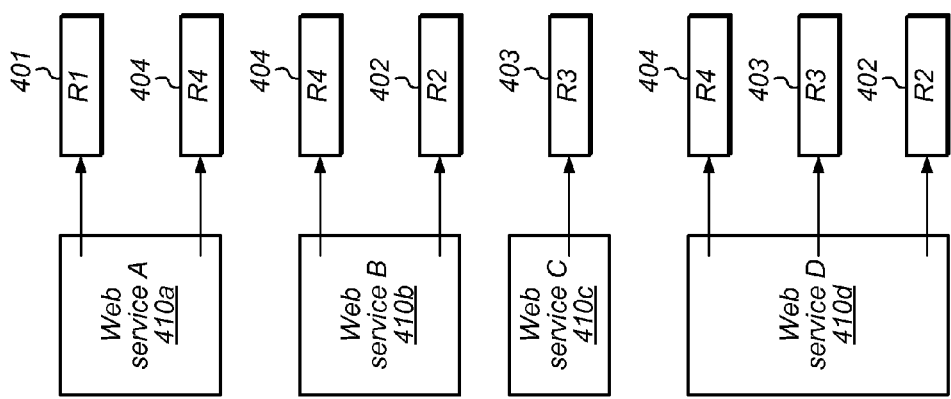

FIGS. 4A and 4B illustrate the queuing of service requests into resource-specific queues for the resources on which they depend, according to one embodiment. FIG. 4A illustrates the dependencies between four different Web services and various downstream services or other constrained resources. FIG. 4B illustrates a set of resource queues 420 for five different constrained resources. In this example, Web service A (410a) is dependent on two downstream services or other constrained resources: resource R1 (401) and resource R4 (404). When the admission control subsystem receives a request for Web service A, an identifier of the request (shown in FIG. 4B as A1) is added to the resource queue for resource R1 (421) and the resource queue for resource R4 (424).

In this example, Web service B (410b) is also dependent on two downstream services or other constrained resources: resource R4 (404) and resource R2 (402). When the admission control subsystem receives a request for Web service B, an identifier of the request (shown in FIG. 4B as B3) is added to the resource queues for resource R4 (424) and R2 (422). In this example, Web service C (410c) is dependent on only one downstream service or other constrained resource: resource R3 (403). When the admission control subsystem receives a request for Web service C, an identifier of the request (shown in FIG. 4B as C5) is added to the resource queue for resource R3 (423). In this example, Web service D (410d) is dependent on three downstream services or other constrained resources: resource R4 (404), resource R3 (403), and resource R2 (402). When the admission control subsystem receives a request for Web service D, an identifier of the request (shown in FIG. 4B as D2) is added to the resource queues for resource R4 (424), R3 (423), and R2 (402). In this example, none of the four illustrated Web services are dependent on resource R5, and there are no pending requests for resource R5 in its queue (425).

Figure 5:
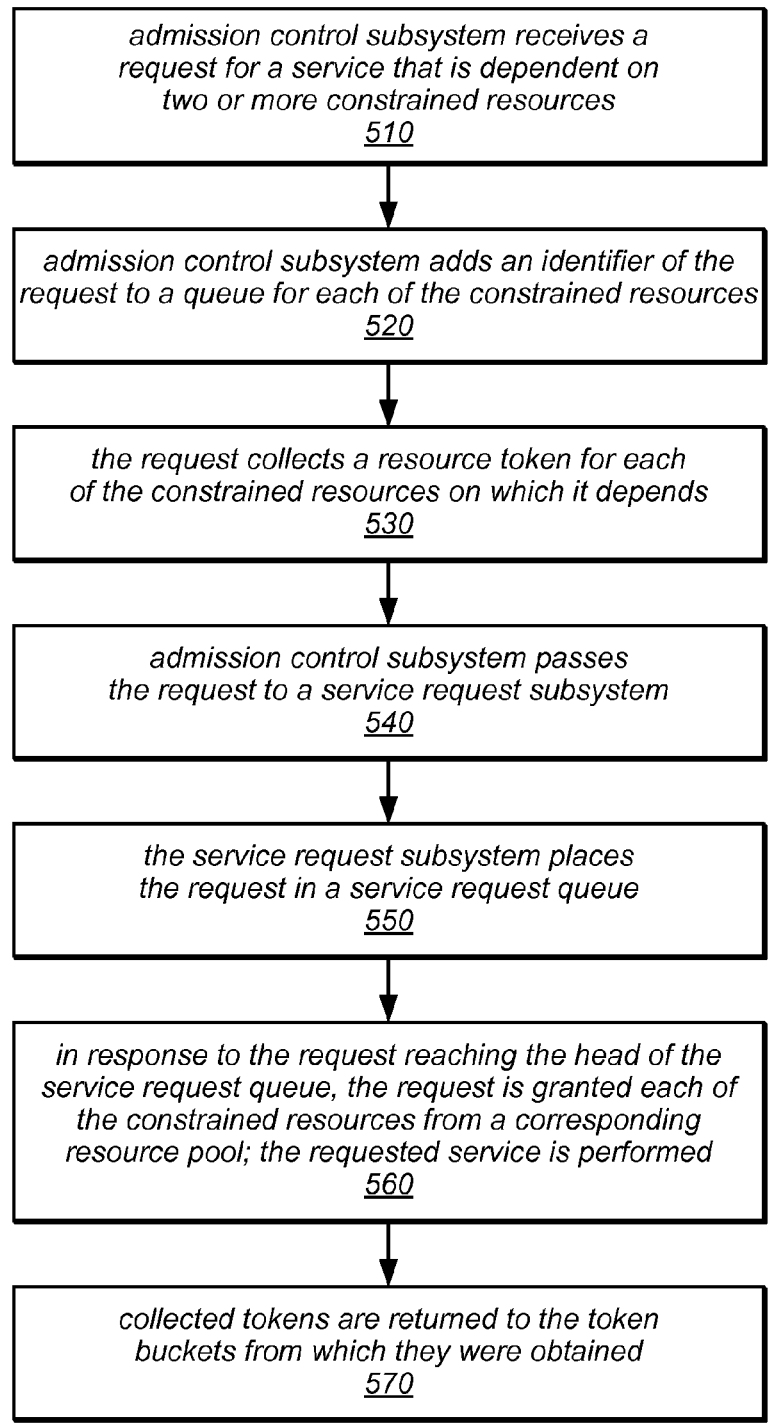
FIG. 5 is a flow diagram illustrating a method for processing a service request that depends on two or more constrained resources, according to one embodiment.

FIG. 5 is a flow diagram illustrating a method for processing a service request in a computing system configured to provide various services to clients when the requested service depends on two or more constrained resources, according to one embodiment. As illustrated at 510 in this example, the method may include an admission control subsystem receiving a request for a service (e.g., Web-based service) that is dependent on two or more constrained resources. As described above, the admission control subsystem may add an identifier of the request to a resource queue for each of the constrained resources on which the requested service depends, as in 520. In some embodiments, the method may include the request collecting a resource token for each of the constrained resources on which it depends, as in 530. For example, the request may collect a resource token as it reaches the head of each respective resource queue, as described above.

Figure 9:
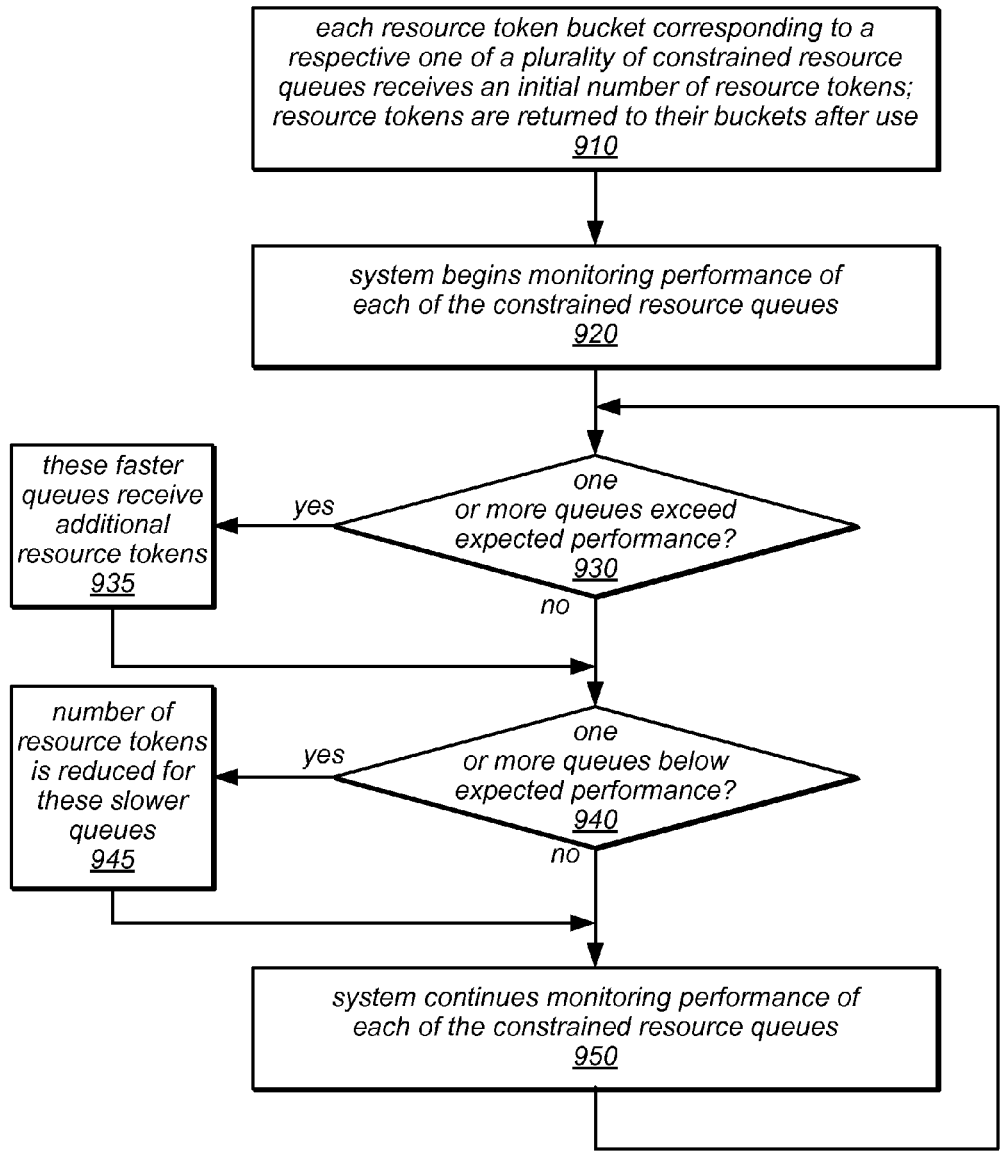
FIG. 9 is a flow diagram illustrating a method for dynamically allocating and/or re-allocating resource tokens to resource token buckets associated with different constrained resource queues, according to one embodiment.

As illustrated in FIG. 5, once the request has collected a resource token for each of the constrained resources on which it depends, the method may include the admission control subsystem passing the request to a service request subsystem, as in 540. In some embodiments, the service request subsystem may place the request in a service request queue, as in 550. In this example, in response to the request reaching the head of the service request queue, the request may be granted each of the constrained resources on which it depends from a corresponding resource pool, as in 560, and the computing system may perform the requested service. Once the requested service has been performed, the resource tokens that were collected by the resource may be returned to the token buckets from which they were obtained, as in 570. Note that in some embodiments, and in some cases, not all of the resource tokens collected by the request may be returned to the same resource token bucket from which they were obtained. For example, in some embodiments, the number of resource tokens allocated to a given resource token bucket may be dynamically adapted, e.g., based on the observed performance of the system. A method for dynamically reallocating resource tokens to resource token buckets for a respective constrained resource queue is illustrated in FIG. 9 and described in detail below.

Figure 6:
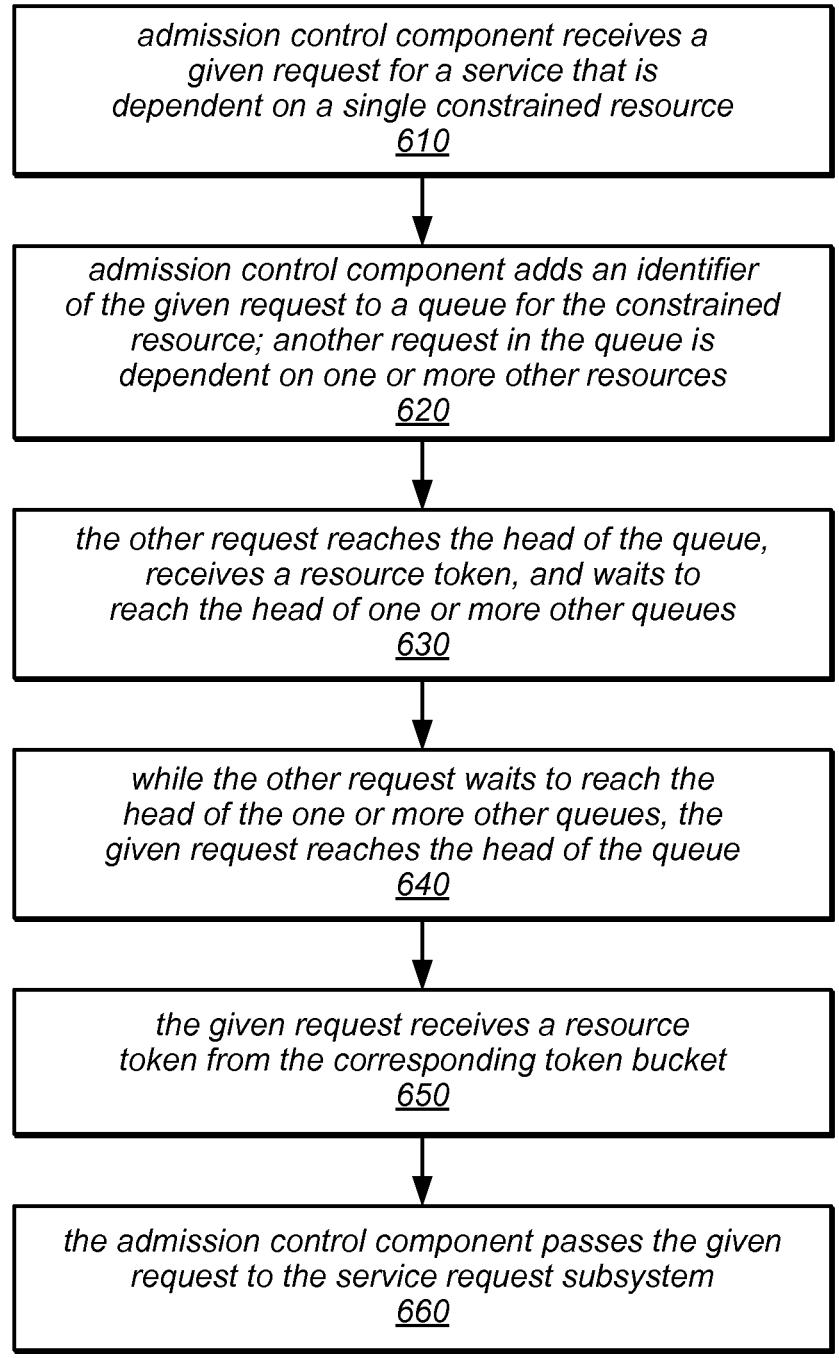
FIG. 6 is a flow diagram illustrating a method for processing a service request that depends on a single constrained resource, according to one embodiment.

In some embodiments, service requests that are dependent on one or a small number of constrained resources may be processed ahead of service requests that were issued (or received) earlier but that are dependent on a larger number of constrained resources, or on one or more resources that are more tightly constrained than others (i.e. less frequently available). FIG. 6 is a flow diagram illustrating a method for processing a service request that depends on a single constrained resource, according to one embodiment. In this example, an admission control component (e.g., the admission control subsystem illustrated in FIG. 2) may receive a given request for a service (e.g., a Web-based service) that is dependent on a single constrained resource, as shown in 610. As illustrated in FIG. 6, the admission control component may add an identifier of the given request to a queue for the constrained resource, as in 620. In this example, another request (i.e. a request already in the queue for the same constrained resource) is dependent on one or more other constrained resources, in addition to being dependent on the single constrained resource on which the given request is dependent.

In this example, the other request reaches the head of the resource queue, receives a resource token from the corresponding resource token bucket, and then waits to reach the head of one or more other resource queues (those associated with the other constrained resources on which it depends), as in 630. While the other request waits to reach the head of the one or more other resource queues, the given request reaches the head of the resource queue, as in 640, and receives a resource token from the corresponding resource token bucket, as in 650. As illustrated at 660 in this example, once the given request receives a resource token for the only constrained resource on which it depends, the admission control component may pass the given request to a service request component (such as the service request subsystem illustrated in FIG. 2) in order to queue the service for execution, even though the given request was issued and/or received by the admission control component after the other request was issued and/or received by the admission control component.

Note that in various embodiments, out of order processing of service requests, such as described above, may be applied for any number of resource requests that wait on different ones of and/or different numbers of constrained resources. In other words, any given request that collects resource tokens for all of its dependencies may be passed to the service request subsystem, even if the given request was issued/received after other requests that are dependent on some of the same constrained resources but that are still waiting to receive one or more resource tokens for other constrained resources on which the given request does not depend.

Figure 7:
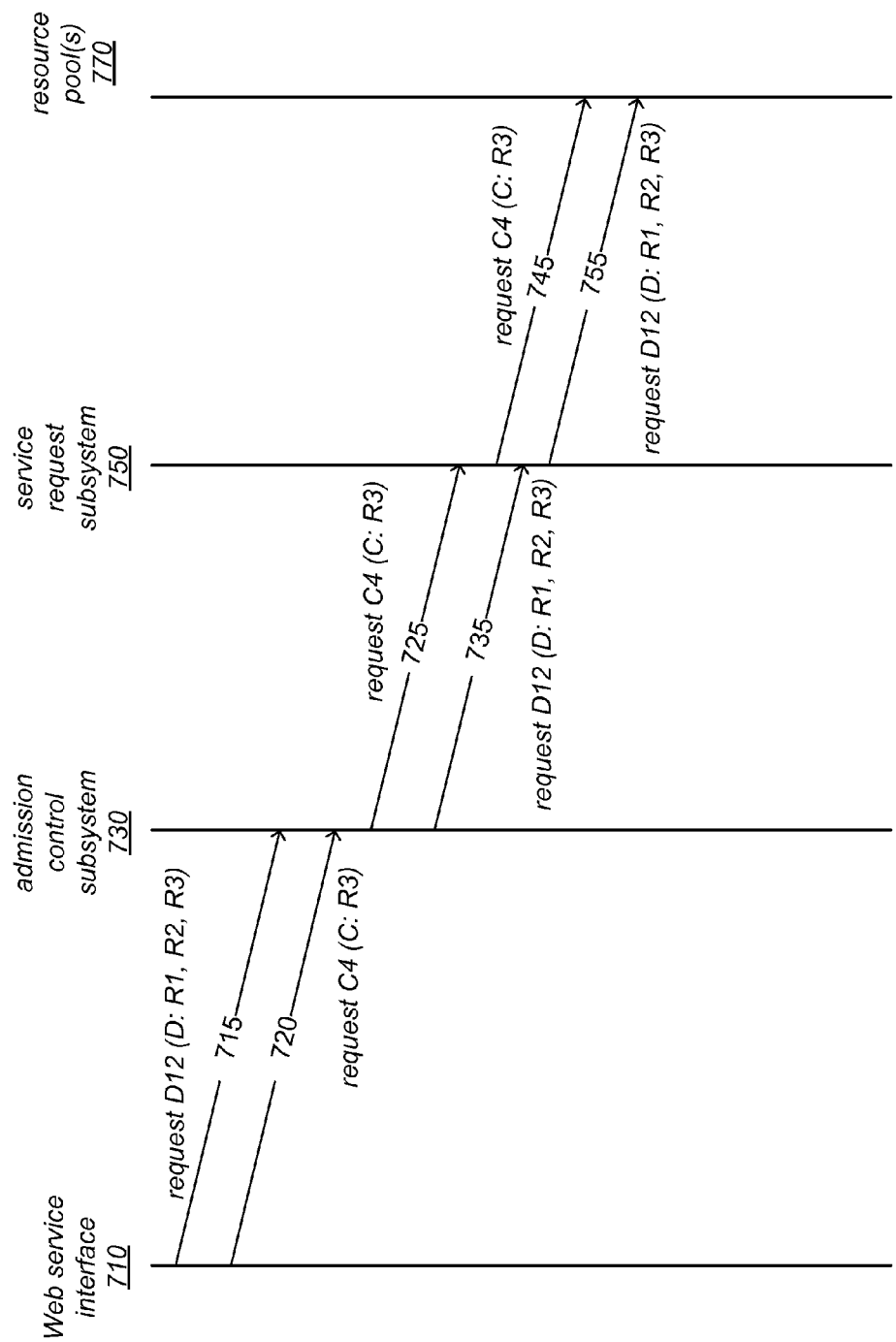
FIG. 7 is a data flow diagram illustrating the processing of services requests by various subsystems of a system that provides Web-based services, according to one embodiment.

Out of order processing of received service requests may be further illustrated by way of the example data flow diagram in FIG. 7. Specifically, FIG. 7 illustrates the processing of two service requests by various subsystems of a computing system that provides Web-based services, according to one embodiment. In this example, a request D12 (shown as 715 in FIG. 7) is passed from Web service interface 710 (e.g., on behalf of a client) to admission control subsystem 730. This request is for a service D, which is dependent on constrained resources R1, R2, and R3, in this example. As described above, admission control subsystem 730 may place an identifier of request D12 in the resource queues for resources R1, R2, and R3. At some point after request D12 is passed to admission control subsystem 730, a request C4 (shown as 720 in FIG. 7) is passed from Web service interface 710 to admission control subsystem 730. This request is for a service C, which is also dependent on constrained resource R3, in this example. Therefore, admission control subsystem 730 may place an identifier of request C4 in the resource queue for resource R3.

In this example, since request D12 was placed in the resource queue for resource R3 prior to request C4, it may reach the head of that resource queue and collect one of the resource tokens for resource R3 before request D12 reaches the head of that resource queue. However, since request D12 is also dependent on resources R2 and R1, this request may need to wait to reach the head of the request queues for these additional resources before it can be passed to service request subsystem 750. In the meantime, request C4 may reach the head of the resource queue for resource R3 and may collect one of the resource tokens for resource R3. Since resource R3 is the only resource on which request C4 depends, it may be passed from admission control subsystem 730 to service request subsystem 750 as soon as it receives the resource token for resource R3. This is illustrated in FIG. 7 as request C4 being passed from admission control subsystem 730 to service request subsystem 750 (shown as 725) prior to request D12 being passed from admission control subsystem 730 to service request subsystem 750 (shown as 735). As described above, when requests C4 and D12 are received by service request subsystem 750, they may be placed in a service request queue (e.g., the same service request queue or two different service request queues) for subsequent servicing.

In the example illustrated in FIG. 7, request C4 reaches the head of the service request queue in which it was placed prior to request D12 reaching the head of the service request queue in which it was placed, and/or the queue in which request C4 was placed is serviced prior to the queue in which request D12 was placed (e.g., according to a round-robin or weighted round-robin scheme). Therefore, request C4 may be passed to one of resource pools 770 (shown as 745), granted the resource on which it is dependent (resource R3), and dispatched for execution prior to request D12 being passed to one or more of resource pools 770 (shown as 755), granted the resources on which it is dependent (resources R1, R2, and R3), and dispatched for execution.

In some embodiments, the second stage of the admission control approach described herein (i.e. the portion of the admission control approach employing one or more service request queues in a service request subsystem) may ensure fairness of queuing across heterogeneous requests. In some embodiments requests of different types (e.g., calls to different Web service APIs) may be placed in separate queues, and each queue may be serviced based on a dispatch-rate weighted round-robin scheme. For example, a Web service containing two APIs, DescribeThing and CreateThing, may include two service request queues, one containing DescribeThing requests and one containing CreateThing requests. If both requests are dispatched at approximately the same (per-thread) rate, the service request queues may be serviced equally. However, if CreateThing runs for twice as long as DescribeThing, on average, then the DescribeThing queue may be serviced twice as often as the CreateThing queue. Note that in other embodiments, the requests in different service request queues may be serviced according to a round-robin approach that is weighted by criteria other than dispatch-rates or that is unweighted. In other embodiments, the system may employ any other suitable method for selecting requests to be serviced from among the requests in two or more service request queues.

In the example above, if there are execution threads (and/or other constrained resources on which pending requests are dependent) available, the dispatch-rate weighted round-robin strategy described above may have no effect on the execution time or order of processing of different requests. However, as the system saturation point is reached, the rate of the dispatch of cheaper calls may increase relative to the rate of the dispatch of more expensive calls. This is most interesting during short load peaks (which may be common due to the Poisson process nature of traffic loads on typical large-scale Web services), when throughput on cheap calls may be preserved in favor of more expensive calls. Therefore, in some embodiments, request queue priorities may be calculated dynamically, which may preserve overall system throughput.

Figure 8:
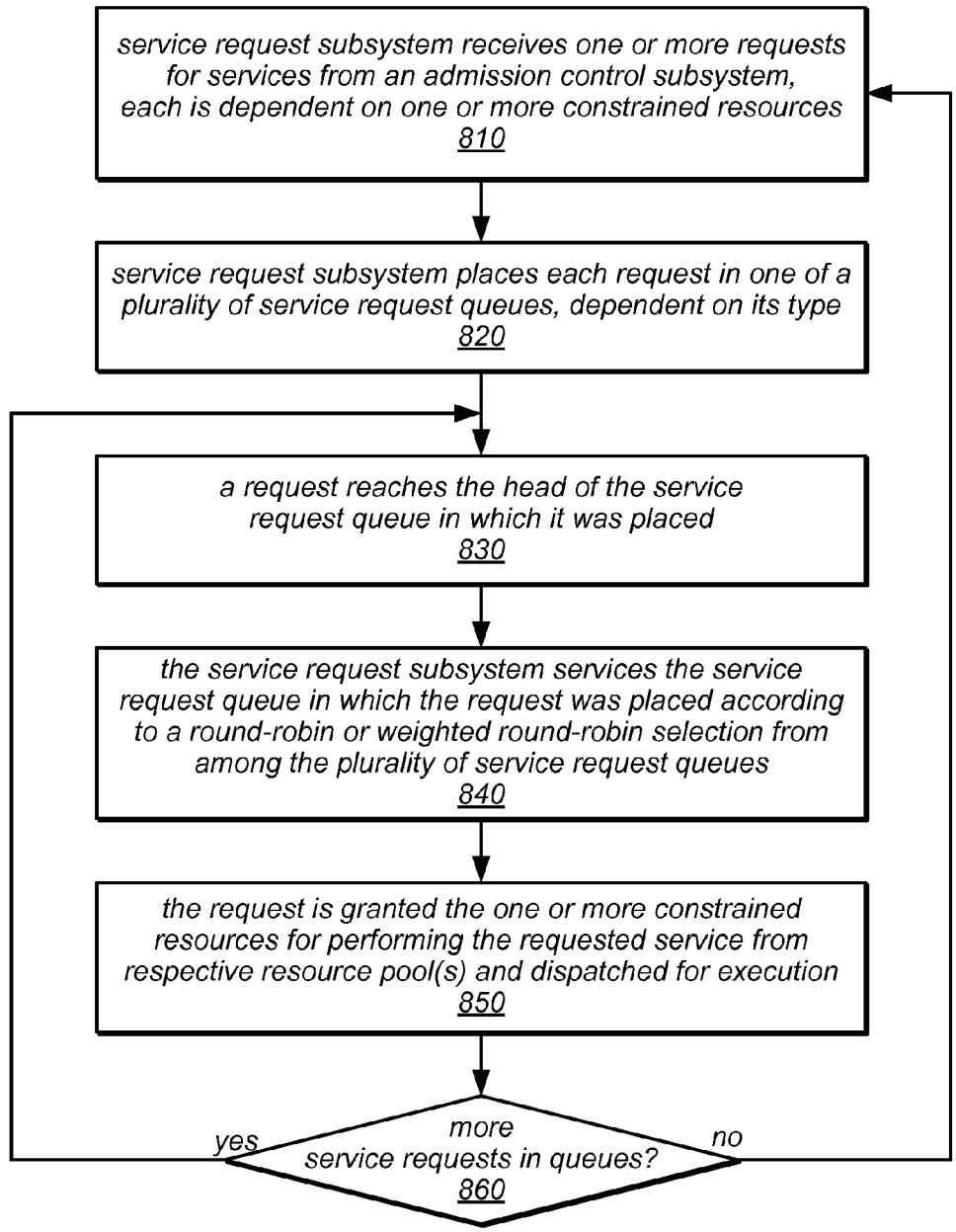
FIG. 8 is a flow diagram illustrating a method for processing service requests of different types, according to one embodiment.

The operation of a service request subsystem is illustrated by the flow diagram in FIG. 8, according to one embodiment. Specifically, FIG. 8 illustrates one embodiment of a method for processing service requests of different types. As illustrated at 810 in this example, the method may include a service request subsystem receiving one or more requests for services (e.g., Web-based services) from an admission control subsystem, such as that described herein. In this example, each of the requests for services is dependent on one or more constrained resources. In some embodiments, the service request subsystem may place an identifier of each service request in one of a plurality of service request queues, as in 820. For example, in some embodiments, the service request subsystem may route requests to a particular one of the service request queues dependent on the type of service that was requested and/or on the specific service that was requested (e.g., the API called to submit the request). In other embodiments, other criteria may be used to partition requests for services received by a service request subsystem into two or more service request queues. In still other embodiments, the service request subsystem may include only a single service request queue, and all requests passed from the admission control subsystem are placed in this queue in response to having been granted a resource token for each of the constrained resources on which it is dependent.

As illustrated in this example, one of the requests may reach the head of the service request queue in which it was placed, as in 830. As described above, in some embodiments, the service request subsystem may service the service request queue in which the request was placed according to a round-robin or weighted round-robin scheme, as in 840. In other words, the service request subsystem may select a request to service next from among the requests that have reached the head of each of the plurality of service request queues using a round-robin or weighted round-robin approach. When the request is serviced, it may be granted the one or more constrained resources for performing the requested service from respective resource pool(s) and dispatched for execution, as in 850. If there are more service requests in the service request queues of the service request subcomponent, shown as the positive exit from 860, the method may include continuing to select and dispatch requests (and allocating to them the constrained resources on which they depend) for any remaining requests in the service request queues, according to the scheme in place for selecting requests to dispatch from among the service request queues. This is shown in FIG. 8 by the feedback from 860 to 830. If there are no more service requests in the service request queues to be processed, shown as the negative exit from 860, the method may include the service request subsystem waiting to receive one or more additional requests for services, and then processing those additional requests in the manner illustrated in FIG. 8. This is shown in FIG. 8 by the feedback from 860 to 810. Note that the operations illustrated in FIG. 8 may be performed continuously as individual service requests and/or collections of service requests are received by and processed in the service request subsystem.

As previously noted, in some embodiments, one or more resource token buckets may be dynamically resized based on the measured performance of downstream services (and/or the measured performance of various resource queues). For example, when a downstream service speeds up (leading to higher rates of dispensing its resource tokens), additional tokens may be placed in (or allocated for) its token bucket to increase throughput for calls depending on that downstream service. Alternatively, if a downstream service slows down (leading to lower rates of dispensing its resource tokens), tokens may be removed from (or deallocated from) its token bucket to preserve throughput for other calls. In some embodiments, the system may support explicit timeouts for service calls 'in flight' to prevent sudden failures causing starvation.

A method for dynamically allocating and/or re-allocating resource tokens to resource token buckets associated with different constrained resource queues is illustrated by the flow diagram in FIG. 9, according to one embodiment. As illustrated at 910 in this example, each resource token bucket corresponding to a respective one of a plurality of constrained resource queues may receive an initial number of resource tokens. For example, an admission control subsystem may allocate a particular number of resource tokens to each of the constrained resources for which it includes a resource queue based on a default value, the number of available resources in the system, previously observed performance, or other criteria. In some embodiments, each resource token bucket may initially be allocated the same number of resource tokens, while in other embodiments the number of resource tokens initially allocated to different resource token buckets may be different. As described herein, resource tokens may, in general, be returned to the resource token buckets from which they were obtained after their use, unless there has been a reallocation of resource tokens in the system since they were obtained. As illustrated in this example, once an initial allocation of resource tokens to resource token buckets has been made (or at any other time, such as at the launch or configuration of the admission control subsystem), the system may begin monitoring performance of each of the constrained resource queues, as in 920. For example, in various embodiments, the system may periodically or continuously measure one or more of: token dispensing rates, average token dispensing rates, latency or average latency for service requests, times or average times that requests remain in various queues, service request failure rates, time to failure or average time to failure, system response times, average response times, or any other suitable performance measurements in the system and/or for any of the queues therein.

As illustrated in this example, if one or more of the resource queues is performing well (e.g., if their throughput exceeds an expected performance level and/or the performance of one or more other resource queues), shown as the positive exit from 930, these faster queues may receive additional resource tokens, as in 935. For example, in some embodiments, as a result of such a re-allocation exercise, resource tokens may be added to a resource token bucket immediately. In other embodiments, as tokens obtained for one or more other constrained resources are returned to the admission control subsystem, they may added to the token buckets of one of these faster resource queues instead of to the token buckets from which they were obtained. Alternatively, if one or more of the resource queues is not performing well (e.g., if their throughput is less than expected and/or than that of one or more other resource queues), shown as the positive exit from 940, the number of resource tokens may be reduced for these slower queues, as in 945. For example, in some embodiments, as a result of such a re-allocation exercise, resource tokens may be removed from a resource token bucket immediately. In other embodiments, as tokens obtained for the corresponding constrained resources are returned to the admission control subsystem, they may added to the token buckets of other resource queues instead of to the token buckets from which they were obtained. As illustrated in this example, the system may in some embodiments continue monitoring the performance of some or all of the constrained resource queues, as in 950, and adaptively re-allocating resource tokens to resource token buckets in response to observed performance as long as the admission control subsystem is in operation. This is illustrated in FIG. 9 by the feedback from 950 to 930.

In some embodiments, the system and methods described herein for allocating constrained resources to service requests may be employed in a system through which various services are provided to subscribers as part of a virtualized computing service. In various embodiments, such virtualized computing may be offered as an on-demand, paid service to clients. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources.

Example Computer System Embodiment

It is contemplated that in some embodiments, any of the methods, techniques or components described herein may be implemented as instructions and data capable of being stored or conveyed via a computer-accessible medium. Such methods or techniques may include, for example and without limitation, various methods for allocating constrained resources to service requests, as described herein. Such instructions may be executed to perform specific computational functions tailored to specific purposes (e.g., processing requests received via a web services interface; determining whether requests are dependent on constrained resources; placing requests in queues for those constrained resources; dispensing resource tokens for constrained resources; and/or servicing requests from one or more service request queues after they have collected resource tokens for each of the constrained resources on which they depend, as described herein) as well as higher-order functions such as operating system functionality, virtualization functionality, network communications functionality, application functionality, storage system functionality, and/or any other suitable functions.

Figure 10:
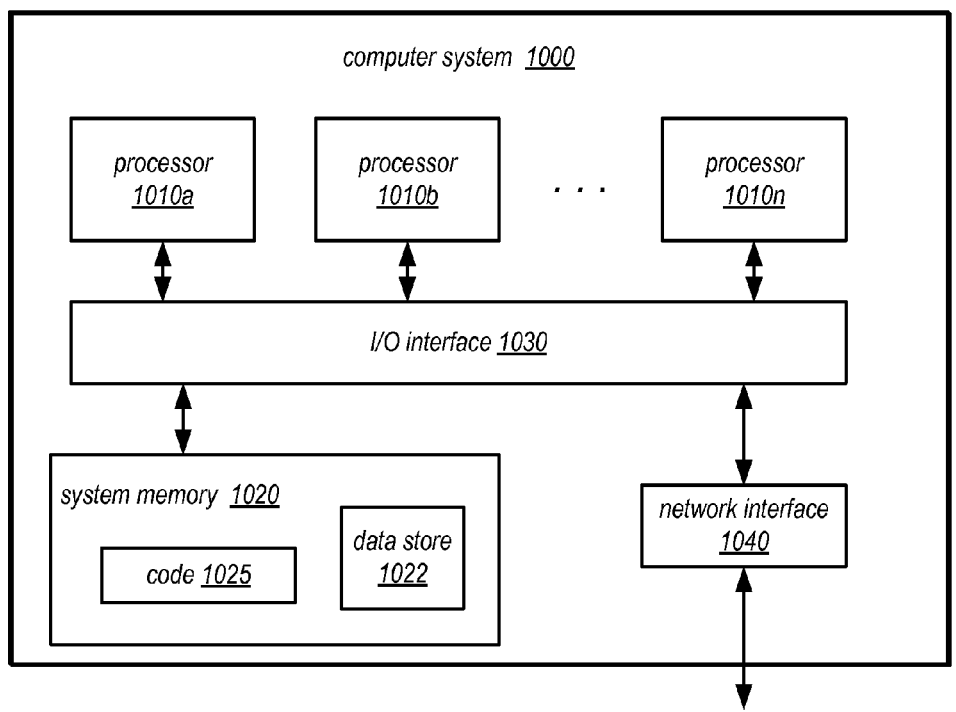
FIG. 10 illustrates one embodiment of a computer system that implements the techniques described herein.

One example embodiment of a computer system that includes computer-accessible media and that allocates constrained resources to service requests using the mechanisms described herein is illustrated in FIG. 10. In various embodiments, the functionality of any of the various modules or methods described herein may be implemented by one or several instances of computer system 1000. In particular, it is noted that different elements of the system described herein may be implemented by different computer systems 1000. For example, a computer system that supports the functionality described herein for allocating constrained resources to service requests may be implemented on the same computer system 1000 on which a client (through which a user/requester accesses the system) executes, or on another computer system 1000, in different embodiments. In another example, different subsystems (e.g., an admission control subsystem and a service request subsystem), different resource queues and/or different service request queues may be implemented on or across multiple ones of the computing nodes, and each of the computing nodes may be similar to computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1010 may commonly, but not necessarily, implement the same ISA.

System memory 1020 may be configured to store instructions (e.g., code 1025) and data (e.g., in data store 1022) accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting the allocation of constrained resources to service requests according to the APIs and other mechanisms described herein), are shown stored within system memory 1020 as code 1025. It is noted that in some embodiments, code 1025 may include instructions and data implementing desired functions that are not directly executable by processor 1010 but are represented or encoded in an abstract form that is translatable to instructions that are directly executable by processor 1010. For example, code 1025 may include instructions specified in an ISA that may be emulated by processor 1010, or by other code 1025 executable on processor 1010. Alternatively, code 1025 may include instructions, procedures or statements implemented in an abstract programming language that may be compiled or interpreted in the course of execution. As non-limiting examples, code 1025 may include code specified in a procedural or object-oriented programming language such as C or C++, a scripting language such as perl, a markup language such as HTML or XML, or any other suitable language.

In some embodiments, data store 1022 within system memory 1020 may store data in one or more request queues, resource queues, resource request data structures, resource token bucket data structures, or other data structures suitable for implementing the techniques described herein.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1020 may include a non-transitory, computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 1000 via I/O interface 1030. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 1000 as system memory 1020 or another type of memory. A computer-accessible storage medium may generally be accessible via transmission media or signals such as electrical, electromagnetic, or digital signals, conveyed via a communication medium such as a network and/or a wireless link, such as may be implemented via network interface 1040.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
performing, by one or more computing devices:
receiving a request for a network-based service;
subsequent to receiving the request, admitting one or more service requests, wherein admitting one or more service requests comprises:
determining that the requested service is dependent on two or more constrained resources; and
for each of the two or more constrained resources:
dispensing, to the received request, a respective resource token based on an availability of tokens in a respective token bucket, wherein a number of tokens in the respective bucket is based on availability of a respective constrained resource;
subsequent to the received request obtaining a resource token for each of the two or more constrained resources on which the requested service is dependent, allocating the two or more constrained resources, wherein allocating the two or more constrained resources comprises:
determining when to schedule the received request based on one or more criteria; and
subsequent to said determining when to schedule the received request based on one or more criteria, allocating execution threads on which to execute the two or more constrained resources to the received request.

2. The method of claim 1, wherein the criteria for determining when to schedule the received request are based at least in part on types of service requests, types of Web-based services, clients of the computing system, groups of clients of the computing system, or a group of service requests.

3. The method of claim 2, wherein determining when to schedule the received request based on one or more criteria comprises applying a keyed hash function to information included in the received request to determine the particular group of service requests to which the received request belongs.

4. The method of claim 2, wherein said allocating comprises servicing the received request in accordance with a round-robin or weighted round-robin scheme for selecting received requests to be serviced.

5. The method of claim 1, further comprising, prior to said receiving, allocating an initial number of resource tokens to each resource token bucket, wherein the initial number of resource tokens allocated to each resource token bucket comprises a default value, or is dependent on the respective constrained resource, historical performance of the respective constrained resource, or historical performance of the one or more computing devices.

6. The method of claim 5, further comprising:
monitoring performance of the system or one or more of the constrained resources; and
modifying the number of resource tokens allocated to at least one of the resource token buckets subsequent to said monitoring.

7. A system, comprising:
one or more computers that each include one or more processors and memory, the one or more computers configured to implement:
an admission control subsystem configured to control admission of one or more service requests, wherein the admission control subsystem is configured to:
receive a service request;
determine that the requested service is dependent on two or more constrained resources; and
for each of the two or more constrained resources the requested service is dependent on, dispense a token corresponding to the constrained resource to the received request from a respective one of two or more resource token buckets;
a service request subsystem configured to initiate allocation of the two or more constrained resources, wherein the service request subsystem is configured to:
subsequent to the received request obtaining a resource token for each of the two or more constrained resources on which the requested service is dependent, allocate the two or more constrained resources to the received request.

8. The system of claim 7,
wherein to allocate the two or more constrained resources to the received request the service request subsystem is further configured to:
place the received request in a service request queue;
wait for the received request to reach the head of the service request queue; and
subsequent to the received request reaching the head of the service request queue, grant the two or more constrained resources to the received request.

9. The system of claim 8, wherein the service request queue is one of a plurality of service request queues, and wherein each of the plurality of service request queues maintains a queue for a different service, for services of a particular type, for a different client of the computing system, for a particular group of clients of the computing system, or for a particular group of service requests.

10. The system of claim 9, wherein to place the received request in the one of the plurality of service request queues, the service request subsystem is further configured to apply a keyed hash function to information included in the received request to determine the particular group of service requests to which the received request belongs.

11. The system of claim 9, wherein to allocate the two or more constrained resources to the received request, the service request subsystem is further configured to service the received request in the service request queue in accordance with a round-robin or weighted round-robin scheme for selection of received requests to be serviced from the plurality of service request queues.

12. The system of claim 7, wherein the admission control subsystem is further configured to: prior to said receive the service request, allocate an initial number of resource tokens to each resource token bucket, wherein the initial number of resource tokens allocated to each resource token bucket comprises a default value, or is dependent on the constrained resource for which it queues requests, historical performance of the constrained resource for which it queues requests, or historical performance of the computer system.

13. The system of claim 12, wherein the admission control subsystem is further configured to:
monitor performance of one or more of a plurality of resource queues; and
modify the number of resource tokens allocated to at least one of the two or more resource token buckets subsequent to said monitoring.

14. The system of claim 7, wherein the one or more computer are further configured to implement:
performance of the requested service; and
subsequent to completion of the requested service, return of the resource tokens for each of the two or more constrained resources to a resource token bucket.

15. The system of claim 7, wherein said allocate the two or more constrained resources to the received request is performed by the service request subsystem while another request that was received prior to the received request and that is also dependent on at least one of the two or more constrained resources waits for another constrained resource on which the received request does not depend.

16. The system of claim 7, wherein the two or more constrained resources comprises two or more different types of constrained resources.

17. The system of claim 7, wherein the two or more constrained resources comprises one or more of: a downstream service, an execution thread, a database connection, an input/output channel, a computational resource, or a portion of system memory, disk memory, or another persistent storage resource.

18. A non-transitory computer-readable storage medium, storing program instructions that when executed by a computer perform:
receiving a request for a service;
determining that the requested service is dependent on two or more constrained resources; and
for each of the two or more constrained resources:
dispensing a resource token for a respective constrained resource to the received request from a respective resource token bucket; and
subsequent to the received request obtaining a resource token for each of the respective two or more constrained resources on which the requested service is dependent:
determining when to schedule the received request based on one or more criteria; and
subsequent to said determining when to schedule the received request based on one or more criteria, allocating execution thread on which to execute the respective two or more constrained resources to the received request.

19. The non-transitory computer-readable storage medium of claim 18, wherein said determining when to schedule the received request based on one or more criteria comprises:
placing the received request in a service request queue;
waiting for the received request to reach a head of the service request queue; and
subsequent to the received request reaching the head of the service request queue, performing said allocating execution threads on which to execute the two or more constrained resources to the received request.

20. The non-transitory computer-readable storage medium of claim 19, wherein placing the received request in a service request queue comprises placing the received request the one of a plurality of service request queues, and wherein placing the received request in the one of the plurality of service request queues comprising applying a keyed hash function to information included in the received request to determine the particular group of service requests to which the received request belongs.

* * * * *